(12) United States Patent
Kedem et al.

(10) Patent No.: US 11,284,403 B2
(45) Date of Patent: *Mar. 22, 2022

(54) ASSIGNMENT OF SECONDARY MMWAVE CHANNELS

(71) Applicant: Intel Corporation, Santa Clara, CA (US)

(72) Inventors: Oren Kedem, Modiin Maccabim-Reut (IL); Artyom Lomayev, Novgorod (RU); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/874,946

(22) Filed: May 15, 2020

(65) Prior Publication Data

US 2020/0288481 A1 Sep. 10, 2020

Related U.S. Application Data

(63) Continuation of application No. 16/267,919, filed on Feb. 5, 2019, now Pat. No. 10,701,703.

(60) Provisional application No. 62/626,256, filed on Feb. 5, 2018.

(51) Int. Cl.
*H04W 72/08* (2009.01)
*H04W 24/08* (2009.01)
(Continued)

(52) U.S. Cl.
CPC ........... *H04W 72/08* (2013.01); *H04W 24/08* (2013.01); *H04W 48/16* (2013.01);
(Continued)

(58) Field of Classification Search
None
See application file for complete search history.

(56) References Cited

U.S. PATENT DOCUMENTS 10,701,703 B2 * 6/2020 Kedem ................. H04W 24/08
2016/0337906 A1 11/2016 Cordeiro
(Continued)

OTHER PUBLICATIONS

U.S. Appl. No. 16/267,919, filed Feb. 5, 2019, Assignment of Secondary Mmwave Channels.
(Continued)

*Primary Examiner* — Otis L Thompson, Jr.
(74) *Attorney, Agent, or Firm* — Schwegman Lundberg & Woessner, P.A.

(57) ABSTRACT

Apparatuses, methods, and computer readable media for assignment of secondary millimeter wave channels. An apparatus of a station (STA) is disclosed that includes processing circuitry configured to decode a basic service set (BSS) operating channels field and a primary channel field from an access point (AP) or personal basic service set control point (PCP), wherein the BSS operating channels field is a bitmap that indicates which 2.16 GHz channels of a plurality of 2.16 GHz channels are permitted to be used for transmissions in the BSS, and wherein the primary channel field indicates a 2.16 GHz channel of the plurality of 2.16 GHz channels that is a primary channel of the BSS. The processing circuitry may be further configured to determine the primary channel, a secondary channel, a secondary1 channel, and a secondary2 channel based on the BSS operating channels field and the primary channel field.

20 Claims, 13 Drawing Sheets

(51) Int. Cl.
*H04W 74/00* (2009.01)
*H04W 48/16* (2009.01)
*H04W 84/12* (2009.01)
*H04W 74/08* (2009.01)

(52) U.S. Cl.
CPC ...... *H04W 74/006* (2013.01); *H04W 74/0808* (2013.01); *H04W 84/12* (2013.01)

(56) References Cited

U.S. PATENT DOCUMENTS

| | | |
|---|---|---|
| 2017/0026981 A1 | 1/2017 | Cariou et al. |
| 2017/0367099 A1 | 12/2017 | Cariou et al. |
| 2018/0199324 A1* | 7/2018 | Sun ................. H04W 16/28 |
| 2018/0242299 A1 | 8/2018 | Xin et al. |
| 2018/0288200 A1 | 10/2018 | Cariou et al. |
| 2019/0044658 A1 | 2/2019 | Lomayev et al. |
| 2019/0174505 A1 | 6/2019 | Kedem et al. |
| 2019/0305996 A1* | 10/2019 | Handte ............... H04L 5/0044 |
| 2020/0204222 A1* | 6/2020 | Lou ................... H04B 7/0417 |

OTHER PUBLICATIONS

"U.S. Appl. No. 16/267,919, 312 Amendment filed May 8, 2020", 3 pgs.
"U.S. Appl. No. 16/267,919, Notice of Allowance dated Feb. 10, 2020", 11 pgs.
"U.S. Appl. No. 16/267,919, PTO Response to Rule 312 Communication dated May 18, 2020", 2 pgs.

\* cited by examiner

BSS OR PBSS

FIG. 8

| ELEMENT ID | LENGTH | ELEMENT ID EXTENSION | PRIMARY CHANNEL | BSS AID | A-BFT PARAMETERS | BSS OPERATING CHANNELS | OPERATING CHANNEL WIDTH |
|---|---|---|---|---|---|---|---|
| 802 | 804 | 806 | 808 | 810 | 812 | 814 | 816 |

| CH1 | CH2 | CH3 | CH4 | CH5 | CH6 | CH7 | CH8 |
|---|---|---|---|---|---|---|---|
| 1 | 1 | 1 | 1 | 1 | 1 | 1 | 1 |
| B0 | B1 | B2 | B3 | B4 | B5 | B6 | B7 |
| 902 | 904 | 906 | 908 | 910 | 912 | 914 | 916 |

BITS 918

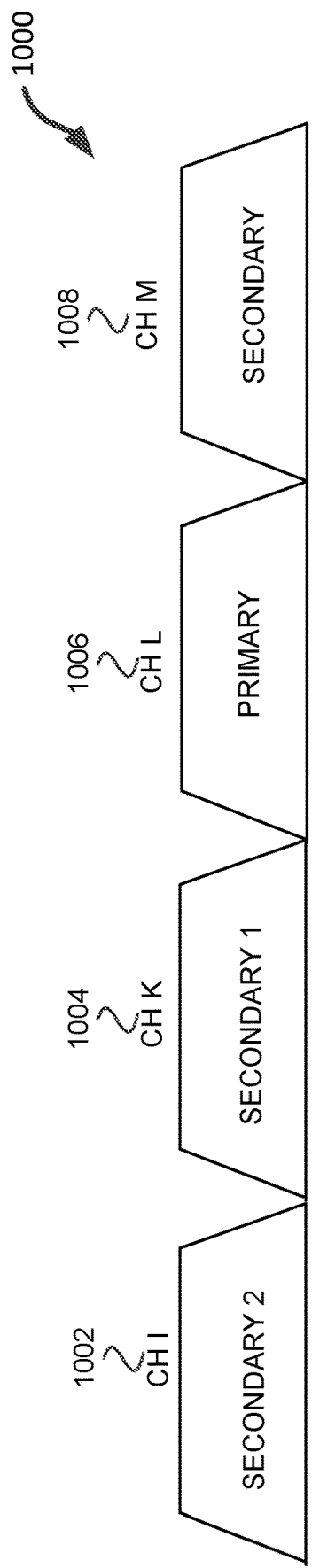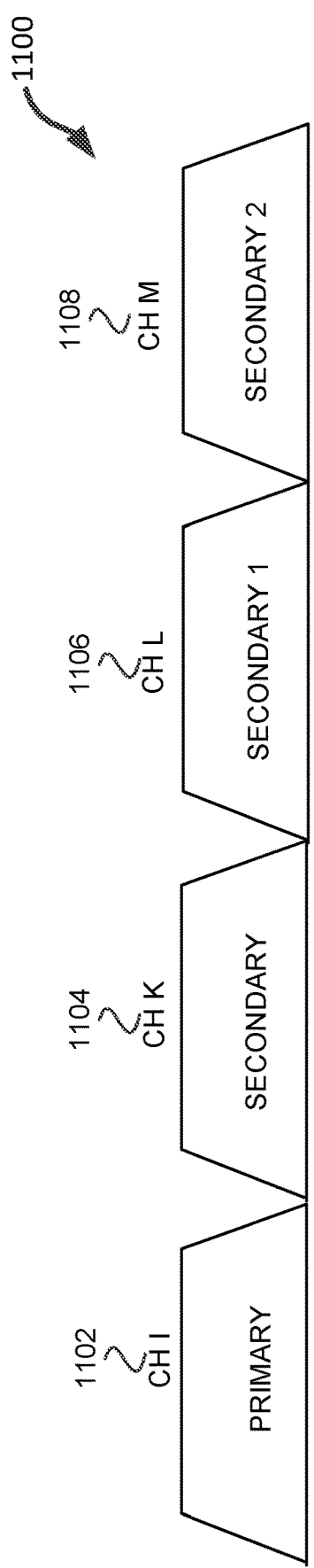

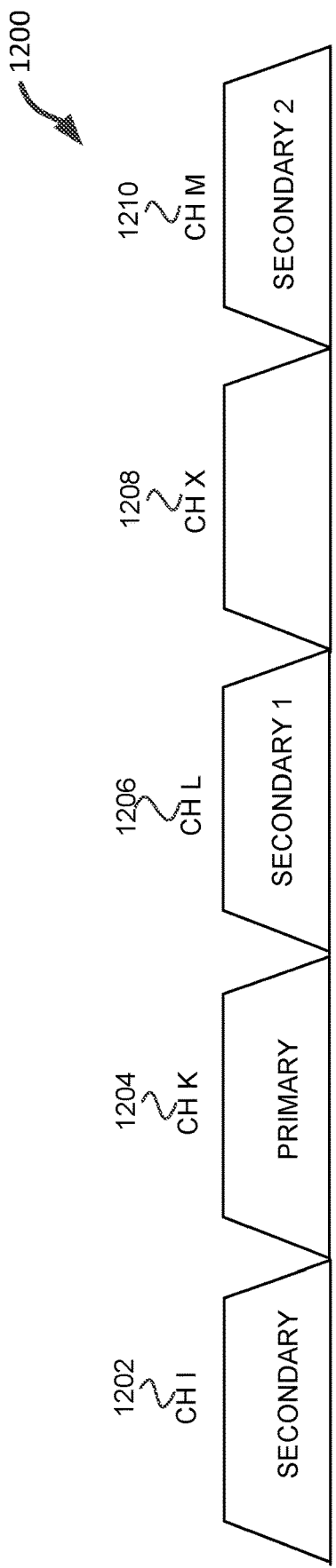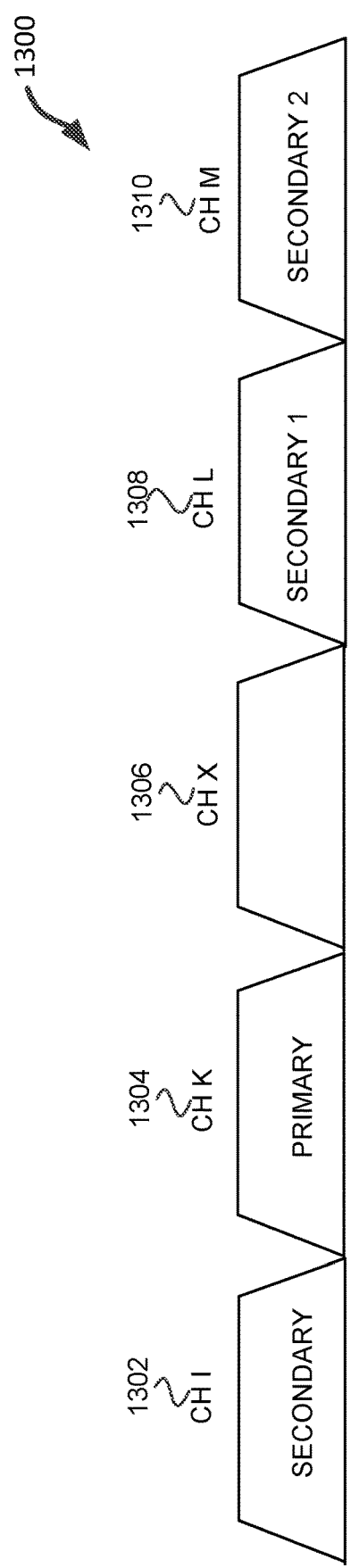

ASSIGNMENT OF SECONDARY MMWAVE CHANNELS

PRIORITY CLAIM

This application is a continuation of U.S. patent application Ser. No. 16/267,919, filed Feb. 5, 2019, which claims the benefit of priority under 35 USC 119(e) to U.S. Provisional Patent Application Ser. No. 62/626,256, filed Feb. 5, 2018, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ad and/or IEEE 802.11ay. Some embodiments relate to methods, computer readable media, and apparatus for training fields for enhanced directional multi-gigabit (EDMG) packets (e.g., a physical layer convergence protocol (PLCP) protocol data unit (PPDU)).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 8 illustrates an EDMG operation element, in accordance with some embodiments;

FIG. 9 illustrates a BSS operating channels field, in accordance with some embodiments;

FIGS. 10-13 illustrates example channel assignments for various BSS operating channels, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
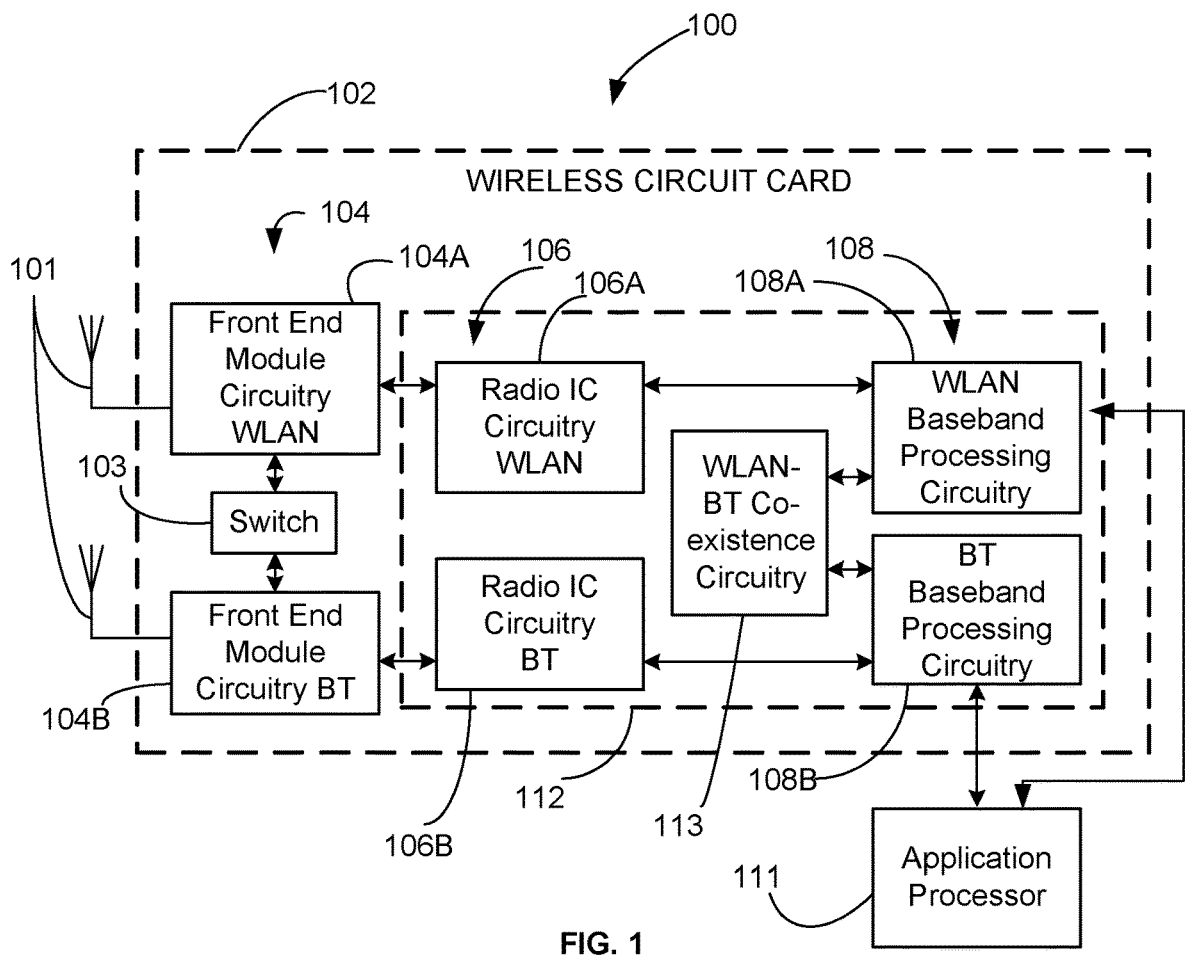
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, IEEE 802.11ax, IEEE 802.11ad, IEEE 802.11ay, and/or WiGiG standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however. In some embodiments, a 2.16 GHz channel may be used. In some embodiments, there may be a primary 2.16 GHz channel and one or more secondary 2.16 GHz channels. In some embodiments, one or more of the 2.16 GHz channels that are adjacent may be bonded together.

Figure 2:
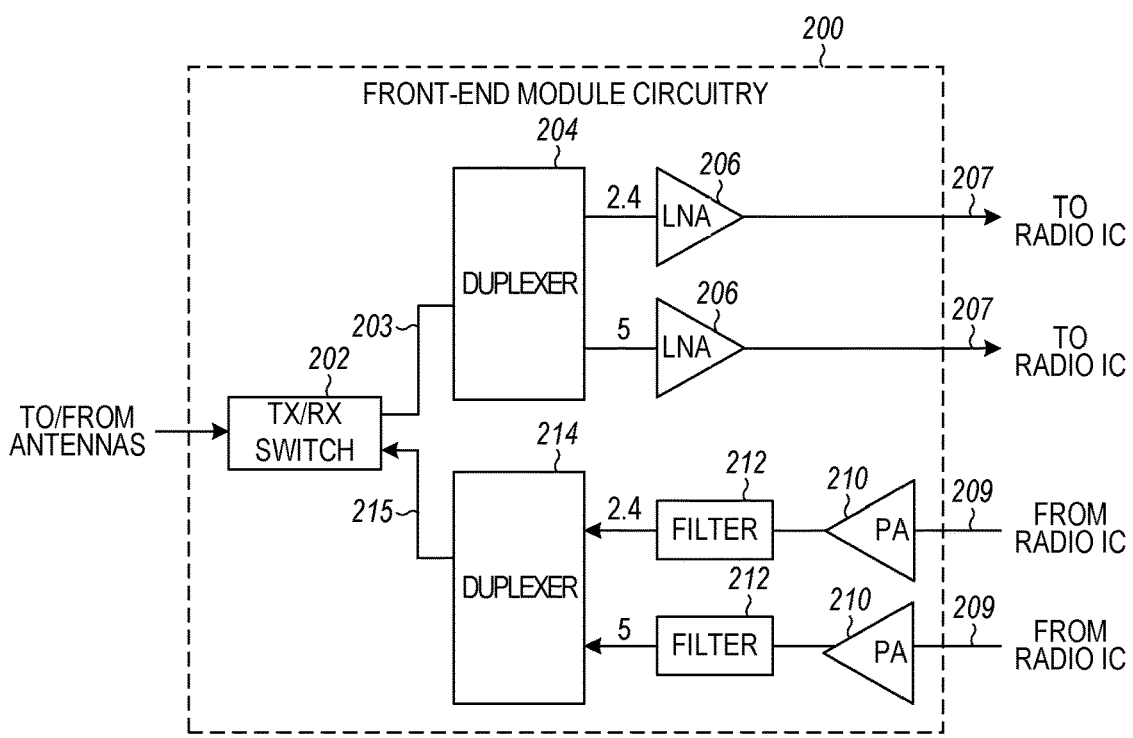
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum, the 5 GHz frequency spectrum, or the 60 GHz spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
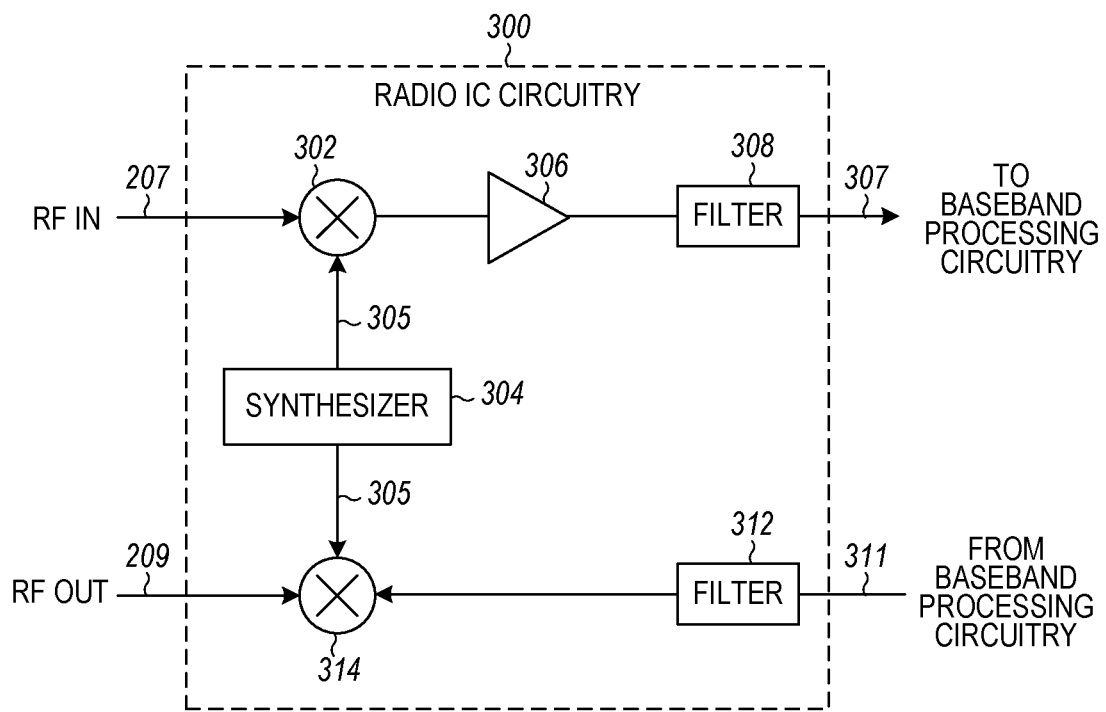
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
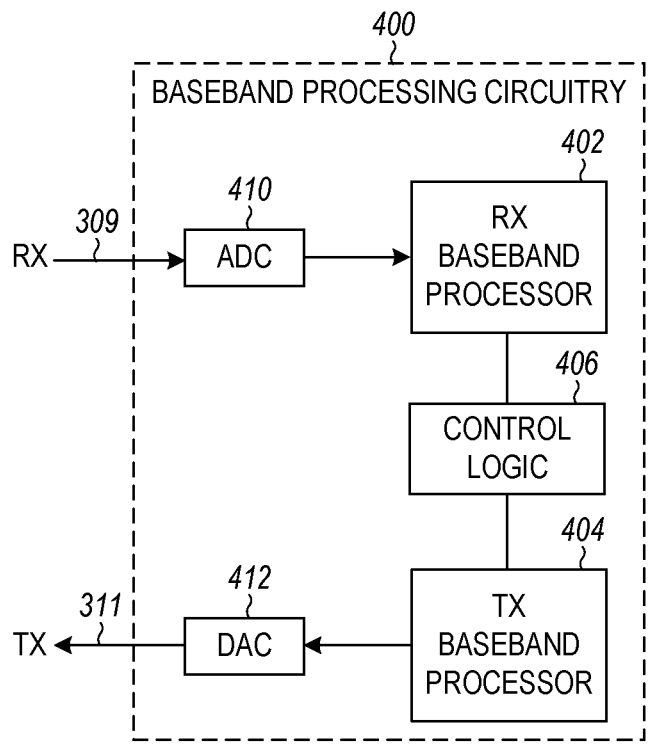
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
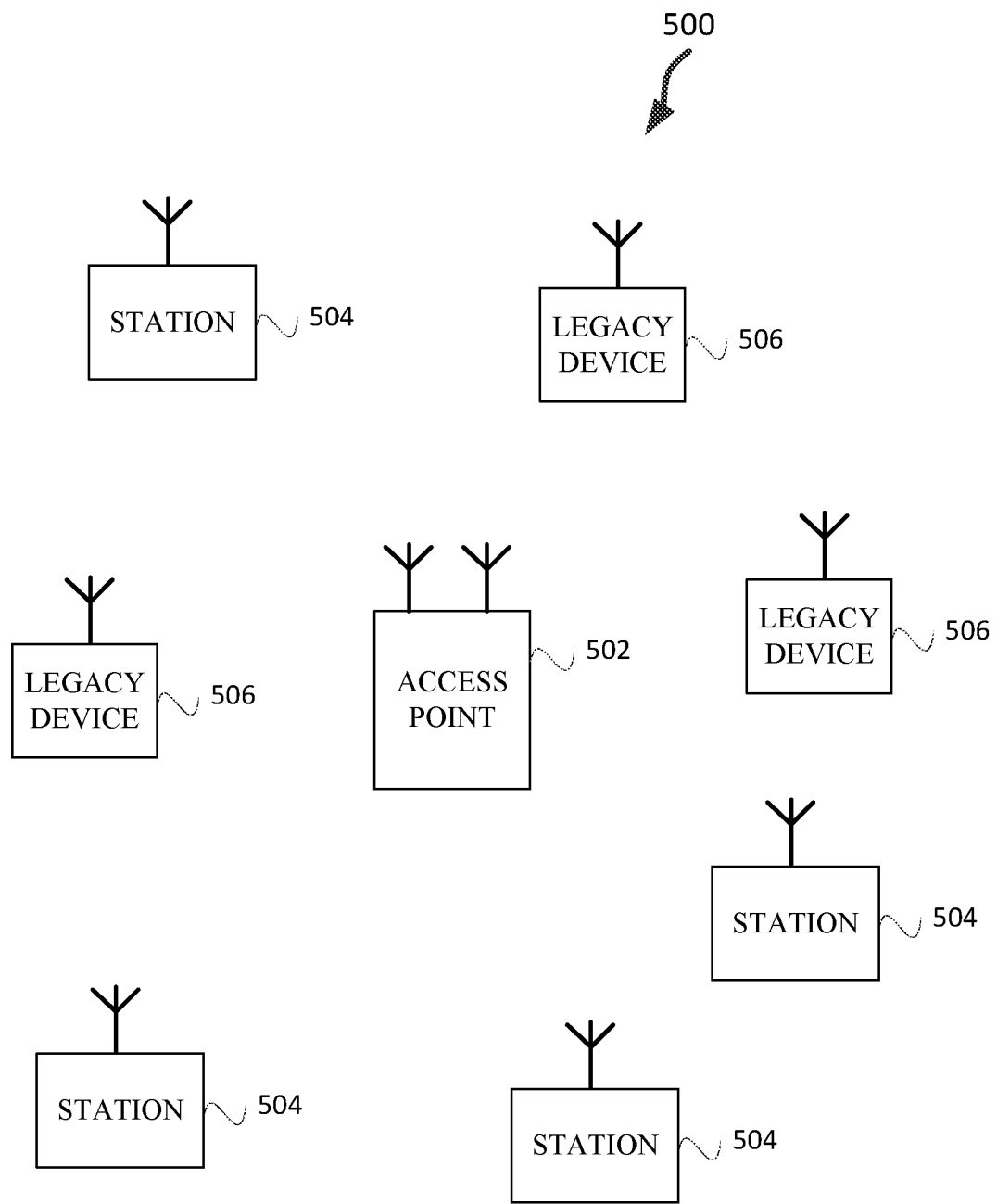
FIG. 5 illustrates a WLAN in accordance with some embodiments.

FIG. 5 illustrates a WLAN 500 in accordance with some embodiments. The WLAN may comprise a basis service set (BSS) or personal BSS (PBSS) 500 that may include a access point (AP) 502, which may be an AP or a station acting as a PBSS control point (PCP), stations 504 (e.g., IEEE 802.11ay), and legacy devices 506 (e.g., IEEE 802.11n/ac/ad). In some embodiments, the access point 502 and/or stations 504 may be an enhanced DMG (EDMG) access point or EDMG stations, respectively. In some embodiments, the legacy devices 506 may be DMG devices.

The AP 502 may be an AP configured to transmit and receive in accordance with one or more IEEE 802.11 communication protocols, IEEE 802.11ax or IEEE 802.11ay. In some embodiments, the access point 502 is a base station. The access point 502 may be part of a PBSS. The access point 502 may use other communications protocols as well as the IEEE 802.11 protocol. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include code division multiple access (CDMA), space-division multiple access (SDMA), multiple-input multiple-output (MIMO), multi-user (MU) MIMO (MU-MIMO), and/or single-input single-output (SISO). The access point 502 and/or station 504 may be configured to operate in accordance with Next Generation 60 (NG60), WiFi Gigabyte (WiGiG), and/or IEEE 802.11ay.

The legacy devices 506 may operate in accordance with one or more of IEEE 802.11 a/b/g/n/ac/ad/af/ah/aj, or another legacy wireless communication standard. The legacy devices 506 may be IEEE 802 stations. The stations 504 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay/ax or another wireless protocol. The stations 504 and/or access point 502 may be attached to a BSS and may also operate in accordance with IEEE 802.11ay where one of the stations 504 and/or access point 502 takes the role of the PCP. The access point 502 may be a station 504 taking the role of the PCP.

The access point 502 may communicate with legacy devices 506 in accordance with legacy IEEE 802.11 communication techniques. In example embodiments, the access point 502 may also be configured to communicate with stations 504 in accordance with legacy IEEE 802.11 communication techniques. The access point 502 may use techniques of 802.11ad for communication with legacy devices 106. The access point 502 and/or stations 504 may be a personal basic service set (PBSS) Control Point (PCP) which can be equipped with large aperture antenna array or Modular Antenna Array (MAA).

The access point 502 and/or stations 504 may be equipped with more than one antenna. Each of the antennas of access point 502 and/or stations 504 may be a phased array antenna with many elements. In some embodiments, an IEEE 802.11ay frame may be configurable to have the same bandwidth as a channel. In some embodiments, the access point 502 and/or stations 504 may be equipped with one or more directional multi-gigabit (DMG) antennas or enhanced DMG (EDMG) antennas, which may include multiple radio-frequency base band (RF-BB) chains. The access point 502 and/or stations 504 may be configured to perform beamforming and may have an antenna weight vector (AWV) associated with one or more antennas. In some embodiments, the AP 502 and/or stations 504 may be a EDMG AP 502 or EDMG station 504, respectively. In some embodiments, the access point 502 and/or STA 504 may transmit a frame, e.g., a PPDU.

An IEEE 802.11ay frame may be configured for transmitting a number of spatial streams, which may be in accordance with MU-MIMO. In other embodiments, the AP 502, stations 504, and/or legacy devices 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies. In some embodiments, the AP 502 and/or stations 504 may be configured to implement more than one communications protocols, which may be collocated in the same device. The two or more communications protocols may use common or separate components to implement the communications protocols.

In accordance with some IEEE 802.11ay embodiments, an AP 502 may be arranged to contend for a wireless medium (e.g., during a contention period) to receive exclusive control of the medium, which may be termed a transmission opportunity (TxOP) for performing beamforming training for a multiple access technique such as OFDMA or MU-MIMO. In some embodiments, the multiple-access technique used during a TxOP may be a scheduled OFDMA technique, although this is not a requirement. In some embodiments, the multiple access technique may be a space-division multiple access (SDMA) technique. The AP 502 may communicate with legacy stations 506 and/or stations 504 in accordance with legacy IEEE 802.11 communication techniques.

In example embodiments, the radio architecture of FIG. 5, the front-end module circuitry of FIG. 2, the radio IC circuitry of FIG. 3, and/or the base-band processing circuitry of FIG. 4 may be configured to perform the methods and functions herein described in conjunction with FIGS. 1-19.

In example embodiments, the stations 504, an apparatus of the stations 504, the access point 502, and/or an apparatus of an access point 502, may include one or more of the following: the radio architecture of FIG. 1, the front-end module circuitry of FIG. 2, the radio IC circuitry of FIG. 3, and/or the base-band processing circuitry of FIG. 4.

In example embodiments, the stations 504, apparatuses of the stations 504, the access points 502, and/or apparatuses of the access point 502, are configured to perform the methods and functions described herein in conjunction with FIGS. 1-19. The term Wi-Fi may refer to one or more of the IEEE 802.11 communication standards. AP may refer to an access point 502. STA may refer to a station 504 and/or a legacy device 506.

Figure 6:
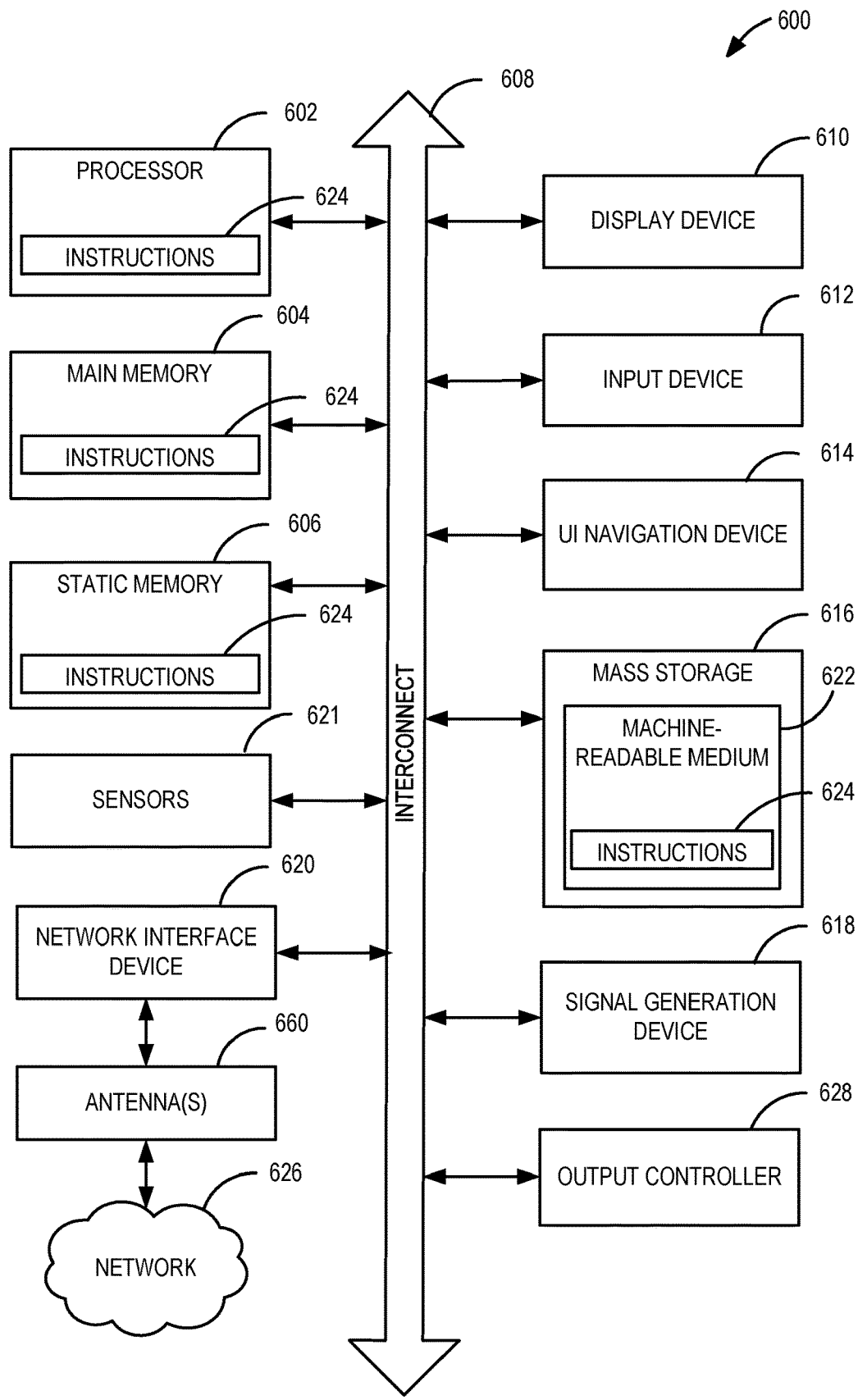
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a access point 502, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise one or more of physical layer circuitry, MAC layer circuitry, processing circuitry, and/or transceiver circuitry. In some embodiments, the processing circuitry may include one or more of the processor 602, the instructions 624, physical layer circuitry, MAC layer circuitry, and/or transceiver circuitry. The processor 602, instructions 624, physical layer circuitry, MAC layer circuitry, processing circuitry, and/or transceiver circuitry may be configured to perform one or more of the methods and/or operations disclosed herein.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within a static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

In some embodiments, an apparatus used by the station 500 may include various components of the station 504 as shown in FIG. 5 and/or the example machines 100, 200, 300, or 600. Accordingly, techniques and operations described herein that refer to the station 504 may be applicable to an apparatus of the station 504, in some embodiments. It should also be noted that in some embodiments, an apparatus used by the AP 502 may include various components of the AP 502 as shown in FIG. 5 and/or the example machine 100, 200, 300, or 600. Accordingly, techniques and operations described herein that refer to the AP 502 may be applicable to an apparatus for an AP, in some embodiments.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware. Accordingly, apparatuses, devices, and operations described herein that refer to the station 504 and/or AP 502 may be applicable to an apparatus for the station 504 and/or AP 502.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.6.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
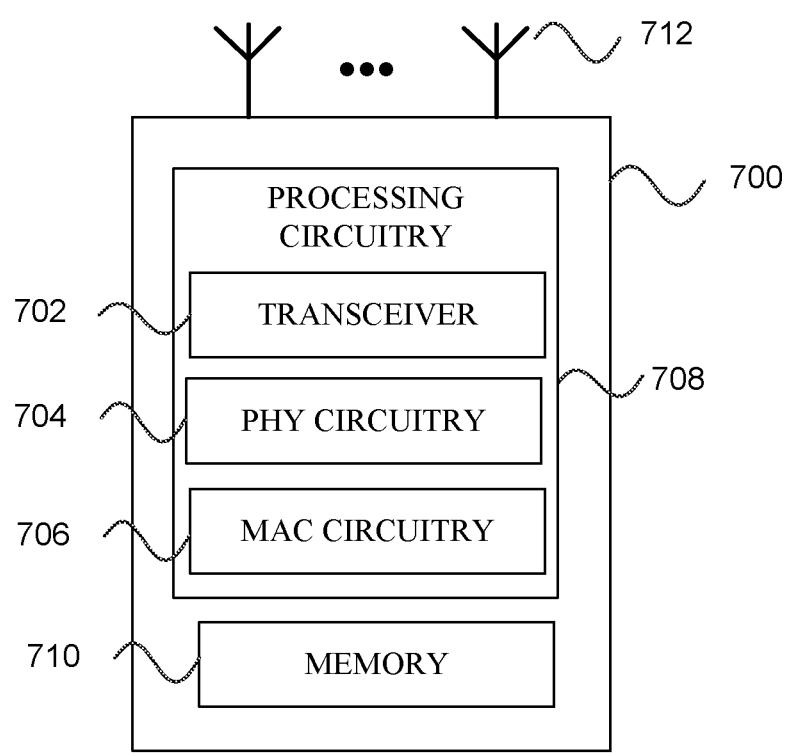
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments, the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general-purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

FIG. 8 illustrates an EDMG operation element 800, in accordance with some embodiments. The EDMG operation element 800 comprising an element identification (ID) field 802, length field 804, element ID extension field 806, primary channel field 808, a BSS AID field 810, an association beamforming training (A-BFT) parameters field 812, a BSS operating channels field 814, and an operating channel width field 816.

In some embodiments, each of the fields 802, 804, 806, 808, 810, 812, 814, and 814 are one (1) octet. The element ID field 802, length field 804, and element ID extension field 806 may indicate a type of the element as EDMG operation element 800. The length field 804 may indicate a length of the EDMG operation element 800. The primary channel (number) field 808 indicates a 2.16 GHz channel number of the primary channel of the BSS (e.g., BSS 500).

The BSS AID field 810 indicates a value in the range of 1 to 254 assigned by an AP or PCP to identify the BSS, in accordance with some embodiments. The A-BFT parameters field 812 defines parameters for beamforming, in accordance with some embodiments.

The BSS operating channels field 814 (e.g., 900) is a bitmap that indicates the 2.16 GHz channel or channels that are allowed to be used for transmission in the BSS and is formatted as shown in FIG. 9. The operating channel width field 816 encodes the allowed channel bandwidth configurations and as defined in Table 1, in accordance with some embodiments. Channel bandwidth (BW) configuration subfield value may be a subfield of operating channel width field 816.

TABLE 1

Operating Channel Width Field Values

| Channel BW Configuration subfield Value | | 2.16 GHz | 4.32 GHz | 6.48 GHz | 8.64 GHz | 2.16 + 2.16 GHz | 4.32 + 4.32 GHz |
|---|---|---|---|---|---|---|---|
| Reserved | 0-3 | | | | | | |
| Operating on 2.16 GHz, 4.32, GHz, 6.48 GHz, and 8.64 GHz only | 4 | 1 | 0 | 0 | 0 | 0 | 0 |
| | 5 | 1 | 1 | 0 | 0 | 0 | 0 |
| | 6 | 1 | 1 | 1 | 0 | 0 | 0 |
| | 7 | 1 | 1 | 1 | 1 | 0 | 0 |
| Operating on 2.16 GHz, 4.32, 6.48 GHz, 8.64 GHz, and 2.16 + 2.16 GHz only | 8 | 1 | 0 | 0 | 0 | 1 | 0 |
| | 9 | 1 | 1 | 0 | 0 | 1 | 0 |
| | 10 | 1 | 1 | 1 | 0 | 1 | 0 |
| | 11 | 1 | 1 | 1 | 1 | 1 | 0 |
| Operating on 2.16 GHz, 4.32, 6.48 | 12 | 1 | 0 | 0 | 0 | 1 | 1 |
| | 13 | 1 | 1 | 0 | 0 | 1 | 1 |

TABLE 1-continued

Operating Channel Width Field Values

| Channel BW Configuration subfield Value | | 2.16 GHz | 4.32 GHz | 6.48 GHz | 8.64 GHz | 2.16 + 2.16 GHz | 4.32 + 4.32 GHz |
|---|---|---|---|---|---|---|---|
| GHz, 8.64 GHz only, 2.16 + 2.16 GHz, and 4.32 + 4.32 GHz only | 14 | 1 | 1 | 1 | 0 | 1 | 1 |
| | 15 | 1 | 1 | 1 | 1 | 1 | 1 |

FIG. 9 illustrates a BSS operating channels field 814, in accordance with some embodiments. The BSS operating channels field 814 may be the same or similar as BSS operating channels field 814. The BSS operating channels field 814 may include a bit for each 2.16 GHz channel. Each bit 918, e.g., bit 0 (B0), bit 1 (B1), etc., may correspond to a channel, e.g., Channel 1 (CH1), channel 2 (CH2), etc. The BSS operating channels field 814 is a bitmap that indicates the 2.16 GHz channel or channels that are allowed to be used for transmissions in the BSS (e.g., BSS 500). The channels may be defined as a portion of the wireless spectrum, e.g., a portion of the 60 GHz wireless spectrum. When a bit 918 is set to 1, transmission on the indicated channel is allowed; otherwise if the bit 918 is set to 0, transmission on the indicated channel is not allowed. The bit 918 corresponding to the primary channel (e.g., the primary channel indicated by the primary channel field 808) is always set to 1 and the total number of bits 918 that are set to 1 may be limited, e.g., to not exceed 4.

Utilizing transmission on BSS Operating Channel that were set to 1 (i.e. active BSS operating channels) is pending Clear channel assessment (CCA) should be done on each of the BSS Operating channels. Hence active BSS operation channels other than the Primary channel are required to be assigned to secondary channels. Table 3 and assignment 1402 are examples of assigning the BSS operating channels to secondary channel, secondary1 channel, and secondary2 channel. Resource allocations, e.g., from the AP or PCP to the STA may then be in logical terms regarding the secondary channel, secondary1 channel, and secondary2 channel.

The results of a clear channel assessment (CCA) may include a channel-list parameter. Table 2 indicates results of a CCA, which may be based on the logical channels.

TABLE 2

Results of CCA

| Channel-List Parameter | Result |
|---|---|
| Primary | Indicates that the primary 2.16 GHz channel is busy |
| Secondary | Indicates that the secondary 2.16 GHz channel is busy |
| Secondary1 | Indicates that the second secondary (second1) 2.16 GHz channel is busy |
| Secondary2 | Indicates that the third secondary 2.16 GHz channel is busy |

FIGS. 10-13 illustrates example channel assignments for various BSS operating channels, in accordance with some embodiments. Illustrated in FIGS. 10-13 are primary, secondary, secondary 1, secondary 2, CH I 1002, 1102, 1202, 1302, CH K 1004, 1104, 1204, 1304, CH X 1208, 1306, CH L 1006, 1106, 1206, 1308, and CH M 1008, 1108, 1210, 1310. Primary, secondary, secondary 1, and secondary 2 are logical channels that may be bonded or aggregated. CH I, CH K, CH L, and CH M are channels assigned to channels that are indicated with 1 as channels that are allowed for transmission by BSS operating channels field, 814. Primary is always assigned to the channel number indicated by the primary channel field 808.

As an example, referring to FIG. 10, BSS operating channel field 814 may have a 1 at CH3 906 and a 1 at CH4 908. The primary channel field 808 may be equal to 3 for CH 3. A station 504 (or AP 502) may transmit on the physical channels CH3 and CH4, which are both 2.16 GHz. The primary and second logical channels may be bonded so that a PPDU may be transmitted over the physical bonded channel CH3 and CH4 with a 4.32 GHz mask PPDU. The operating channel width field 816 may indicate that a 4.32 GHz mask PPDU is allowed. For example, the channel BW configuration subfield value may be 6, which indicates that 4.32 GHz mask PPDUs are permitted. CH I, CH K, CH L, and CH M indicate that CH I<CH K<CH L<CH M for physical channels indicated in BSS operating channel field 814. One, two, three, or four channels may be indicated to map to CH I, CH K, CH L, and CH M. If only one channel is indicated in BSS operating channel field 814, then it maps to CH I. If two channels are indicated in BSS operating channel field 814, then it maps to CH I and CH K. If three channels are indicated in BSS operating channel field 814, then it maps to CH I, CH K, and CH L. If four channels are indicated in BSS operating channel field 814, then it maps to CH I, CH K, CH L, and CH M. FIGS. 10-13 indicate that the order of the logical channels may change. There may be one or more channels between CH I, CH K, CH L, and CH M.

Additionally, different PPDUs may be used. For example, referring to FIG. 10, where "+" indicates a bonded channel: primary 1006+second 1008; secondary1 1004+primary 1006+secondary 1008; primary 1006+secondary1 1004; second2 1002+second) 1004+primary 1006; or, second2 1002+secondary1 1004+primary 1006+secondary 1008. Aggregated channels may also be used, for example, referring to FIG. 11, primary 1102 and secondary1 1106. In another example, referring to FIG. 13, second 1302+primary 1304 and secondary1 1308+secondary2 1310, which indicates a combination of bonding "+"" and aggregation "and."

Figure 14:
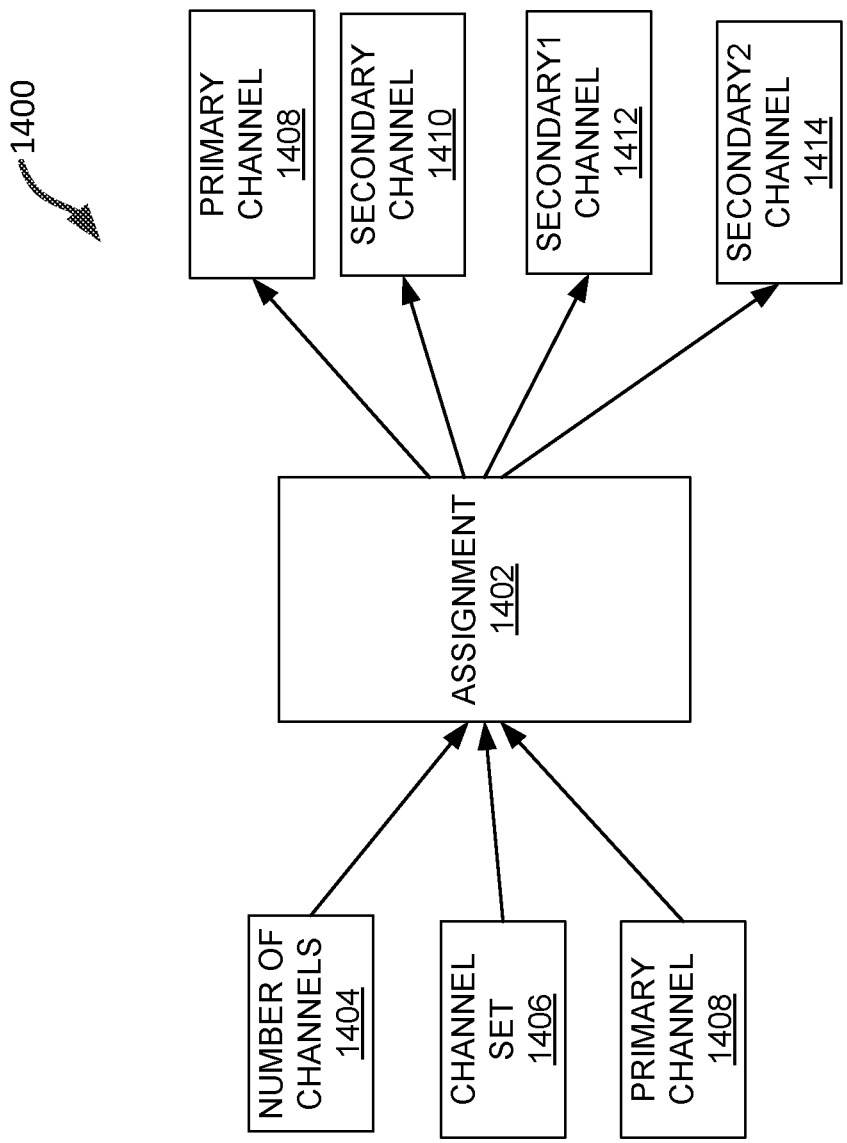
FIG. 14 illustrates assignment of secondary, secondary1, and secondary2 channels 1400, in accordance with some embodiments.

FIG. 14 illustrates assignment of secondary, secondary1, and secondary2 channels 1400, in accordance with some embodiments. Illustrated in FIG. 14 is assignment 1402, number of channels 1404, channel set 1406, primary channel 1408, secondary channel 1410, secondary1 channel 1412, and secondary2 channel 1414. Assignment 1402 takes number of channels 1404, channel set 1406, primary channel 1408 and returns secondary channel 1410, secondary1 channel 1412, and second2 channel 1414. The number of channels 1404 may be a number of channels in the channel set 1406. The channel set 1406 may be the number of channels that are indicated in the BSS operating channel field 814, e.g., the number of bits 918 that are set to 1. The primary channel 1408 is the primary channel that is indicated in the primary channel field 808.

Secondary channel 1410 is an assignment of one of the channels indicated in the channel set 1406 if the number of channels indicated in the channel set 1406 is at least two. Secondary channel1 channel 1412 is an assignment of one of the channels indicated in the channel set 1406 if the number of channels 1404 is at least three. Second2 channel 1414 is an assignment of one of the channels indicated in the channel set 1406 if the number of channels is at least four. If the number of channels 1404 is one, then there is no assignment beyond keeping the primary channel indicated by primary channel 1408 the same. For a number of channels 1404 of two, the assignment 1402 will assign the secondary channel 1410 to the channel of the channel set 1406 that is not the primary channel 1408. For example, if the primary channel 1408 is channel 1 and the channel set 1406 indicates channel 1 and channel 3, then the assignment will assign channel 3 to secondary channel 1410.

The assignment 1402 may determine the assignment of the secondary channel 1410, secondary1 channel 1412, and secondary2 channel 1414 based on a location of the primary channel 1408 within the channel set 1406. For example, assignment 1402 may assign the second channel 1410 to with a channel to the left of or the right of the primary channel 1408. This enables channel bonding between the primary channel 1408 and the secondary channel 1410. For example, if the primary channel is channel 2, then the assignment 1402 may assign the secondary channel 1410 as channel 1 if the channel set 1406 indicates that channel 1 is part of the channel set 1406.

Table 3 is an example assignment of BSS Operating channels to secondary, secondary1 and secondary2 channels based on the channel set and the primary channel. In the channel set, e.g., BSS operating channels 814, i<j<l<m. The primary channel, e.g., by primary channel 808. Secondary, secondary1, and secondary2 are then assigned or defined by Table 3 by setting the values of i, j, l, and m to the values of the channels set in accordance with the number of channels that are set in the channels set, e.g., number of bits set to 1 in BSS operating channels field 814.

Figure 15:
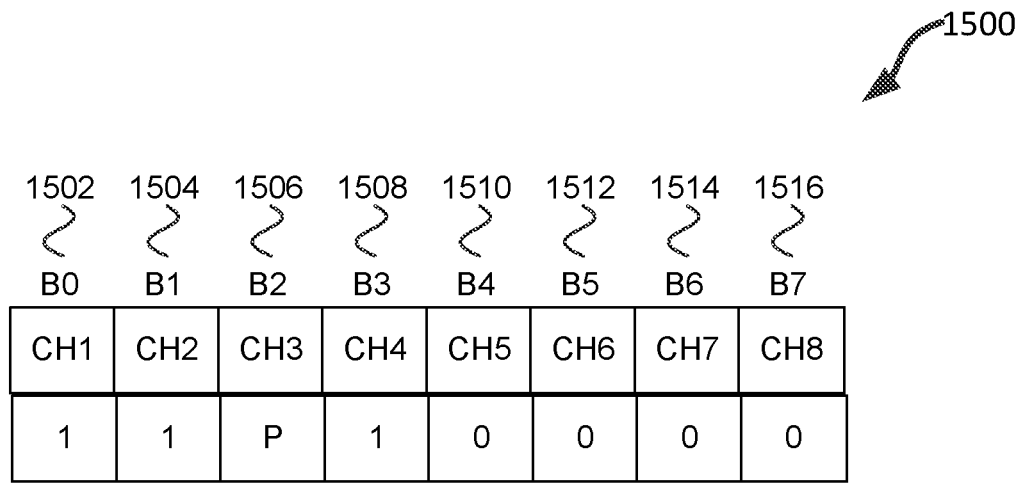
FIG. 15 illustrates an example of a BSS operating channels field, in accordance with some embodiments.
Figure 16:
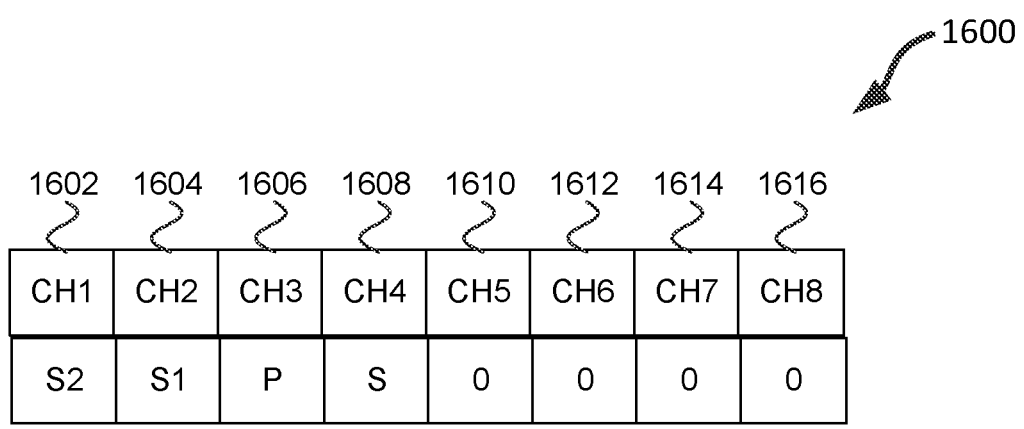
FIG. 16 illustrates an example of the assignment of secondary, secondary1, and secondary2 channels, in accordance with some embodiments.
Figure 17:
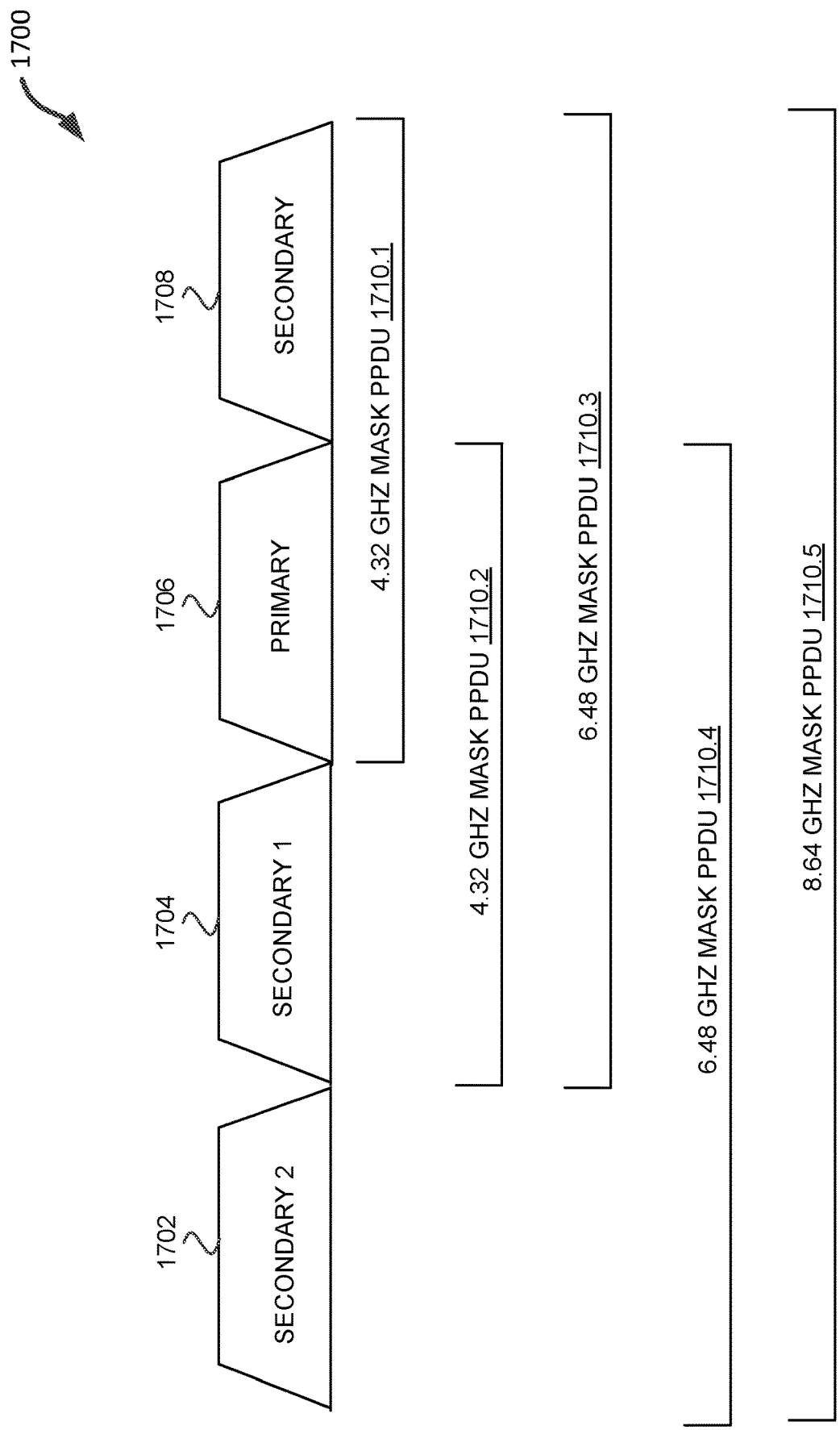
FIG. 17 illustrates various masks that may be used for the channelization of FIG. 16, in accordance with some embodiments.

FIGS. 15-17 illustrate an example and will be disclosed in conjunction with one another. FIG. 15 illustrates an example of a BSS operating channels field 1500, in accordance with some embodiments. Illustrated in FIG. 15 are bits B0 1502, B1 1504, B2 1506, B3 1508, B4 1510, B5 1512, B6 1514, and B7 1516. B0 1502 represents channel 1 of the wireless spectrum. B0, B1, and B3 1502, 1504, and 1508, respectively, have a value of 1 indicating that CH1, CH2, and CH4, respectively, are permitted to be used for the BSS. B2 1506 has a value of 1 as well, but is indicated as a "P" to indicate that the value of the primary channel field 808 is 3 to indicate that CH3 is the primary channel. The primary channel may be indicated in another manner.

FIG. 16 illustrates an example of the assignment of secondary, secondary1, and secondary2 channels 1600, in accordance with some embodiments. Illustrated in FIG. 16 are channels CH1 1602, CH2 1604, CH3 1606, CH4 1608, CH5 1610, CH6 1612, CH7 1614, and CH8 1616. Based on BSS operating channel fields 1500, the EDMG secondary channel, secondary1 channel, and secondary2 channel are as assigned or defined as illustrated in FIG. 1600. For example, referring to Table 3, there are four operating channels, and the order of the operating channels with the smallest first is (1, 2, 3, 4) with the primary channel being 3. Therefore, i=1, k=2, l=3, and m=4. With primary channel being 1. The matching row is "Ch(l), Ch(m), Ch(k), Ch(i)" with the

TABLE 3

Configuration or assignment of primary channel, secondary channel, secondary1 channel, and secondary2 channel based on the channel set and the primary channel

| Number of channels | Channels set | Configuration presented in Primary Channel field and in BSS Operating Channels field | | | |
|---|---|---|---|---|---|
| | | Primary | Secondary | Secondary1 | Secondary2 |
| 1 | Ch(i) <br> i = (1), (2), (3), (4), (5), (6) | Ch(i) | NA | NA | NA |
| 2 | Ch(i), Ch(k) <br> (i, j) = (1, 2), (1, 3), (1, 4), (1, 5), (1, 6), (2, 3), (2, 4), (2, 5), (2, 6), (3, 4), (3, 5), (3, 6), (4, 5), (4, 6), (5, 6) | Ch(i) <br> Ch(k) | Ch(k) <br> Ch(i) | NA <br> NA | NA |
| 3 | Ch(i), Ch(k), Ch(l) <br> (i, k, l) = (1, 2, 3), (1, 2, 4), (1, 2, 5), (1, 2, 6), (2, 3, 4), (2, 3, 5), (2, 3, 6), (3, 4, 5), (3, 4, 6), (4, 5, 6) | Ch(i) <br> Ch(k) <br> Ch(l) | Ch(k) <br> Ch(i) <br> Ch(k) | Ch(l) <br> Ch(l) <br> Ch(i) | NA <br> NA <br> NA |
| 3 | Ch(i), Ch(k), Ch(l) <br> (i, k, l) = (1, 3, 4), (1, 3, 5), (1, 3, 6), (1, 4, 5), (1, 4, 6), (1, 5, 6), (2, 4, 5), (2, 4, 6), (2, 5, 6), (3, 5, 6) | Ch(i) <br> Ch(k) <br> Ch(l) | Ch(k) <br> Ch(l) <br> Ch(k) | Ch(l) <br> Ch(i) <br> Ch(i) | NA <br> NA <br> NA |
| 4 | Ch(i), Ch(k), Ch(l), Ch(m) <br> (i, k, l, m) = (1, 2, 3, 4), (2, 3, 4, 5), (3, 4, 5, 6), (1, 2, 4, 5), (1, 2, 5, 6), (2, 3, 5, 6), (1, 2, 4, 6) | Ch(i) <br> Ch(k) <br> Ch(l) <br> Ch(m) | Ch(k) <br> Ch(i) <br> Ch(m) <br> Ch(l) | Ch(l) <br> Ch(l) <br> Ch(k) <br> Ch(k) | Ch(m) <br> Ch(m) <br> Ch(i) <br> Ch(i) |
| 4 | Ch(i), Ch(k), Ch(l), Ch(m) <br> (i, k, l, m) = (1, 2, 3, 5), (1, 2, 3, 6), (2, 3, 4, 6) | Ch(i) <br> Ch(k) <br> Ch(l) <br> Ch(m) | Ch(k) <br> Ch(i) <br> Ch(k) <br> Ch(l) | Ch(l) <br> Ch(l) <br> Ch(i) <br> Ch(k) | Ch(m) <br> Ch(m) <br> Ch(m) <br> Ch(i) |
| 4 | Ch(i), Ch(k), Ch(l), Ch(m) <br> (i, k, l, m) = (1, 3, 4, 5), (1, 4, 5, 6), (2, 4, 5, 6), (1, 3, 5, 6) | Ch(i) <br> Ch(k) <br> Ch(l) <br> Ch(m) | Ch(k) <br> Ch(l) <br> Ch(m) <br> Ch(l) | Ch(l) <br> Ch(m) <br> Ch(k) <br> Ch(k) | Ch(m) <br> Ch(i) <br> Ch(i) <br> Ch(i) |
| 4 | Ch(i), Ch(k), Ch(l), Ch(m) <br> (i, k, l, m) = (1, 3, 4, 6) | Ch(i) <br> Ch(k) <br> Ch(l) <br> Ch(m) | Ch(k) <br> Ch(l) <br> Ch(k) <br> Ch(l) | Ch(l) <br> Ch(i) <br> Ch(i) <br> Ch(k) | Ch(m) <br> Ch(m) <br> Ch(m) <br> Ch(i) | column headings "Primary, Secondary, Secondary1, and Secondary2." So, Ch(1)=primary (P)=3; Ch(m)=secondary (S)=4; Ch(k)=secondary1 (S1)=3; and, Ch(i)=secondary2 (S2)=1. These assignments are definitions are represented in FIG. 16. FIGS. 15 and 16 illustrate how a STA 504 or AP 502 would determine the operating channels (logical) of a BSS based on Table 3, primary channel field 808, and BSS operating channels field 814, which may be included in an EDMG operation element 800.

FIG. 17 illustrates various masks that may be used for the channelization of FIG. 16, in accordance with some embodiments. Illustrated in FIG. 17 is secondary2 channel 1702 (CH1), secondary 1 channel 1704 (CH2), primary channel 1706 (CH3), secondary channel 1708 (CH4), 4.32 GHz mask PPDU 1710.1, 4.32 GHz mask PPDU 1710.2, 6.48 GHz mask PPDU 1710.3, 6.48 GHz mask PPDU 1710.4, and 8.64 GHz mask PPDU 1710.5. A STA 504 or AP 502 could use the different masks 1710 to transmit on the permitted channels 1702, 1704, 1706, and 1708. The STA 504 or AP 502 may refer to Table 1 as an example of operating channel width field 816 to determine which masks 1710 are permitted. In an example, the value of the operating channel width field 816 may be 6 indicating that 4.32 GHz mask PPDUs 1710.1, 1710.2 and 6.48 GHz mask PPDUs 1710.3, 1710.4 are permitted, but that 8.64 GHz mask PPDUs 1710.5 are not permitted.

Additionally, the STA 504 may perform a CCA, which as an example may return CCA.Primary=IDLE; CCA.Secondary=IDLE; CCA.Secondary1=IDLE; and, CCA.Secondary2=BUSY. Meaning only primary channel 1706, secondary channel 1708, and secondary1 channel 1704 are available to use. So 6.48 GHz mask PPDU 1710.4 and 8.64 GHz mask PPDU 1710.5 can not be used regardless of the value of operating channel width field 816 because secondary2 channel 1702 is busy. Nor can the STA 504 transmit on 2.16 GHz+2.16 GHz mask PPDU for secondary2 channel 1702 and primary channel 1706, because secondary2 channel 1702 is busy.

If the channel BW configuration (e.g., a row of Table 1) indicates that channel bandwidth (CB) of 4.32 GHz is supported, then 4.32 GHz mask PPDU 1710.1 and 4.32 GHz mask PPDU 1710.2 could be used by the STA 504 or AP 502. If the channel BW configuration (e.g., a row of Table 1) indicates that CB of 6.48 GHz is supported, then 6.48 GHz mask PPDU 1710.3 could be used by the STA 504 or AP 502 (not 6.48 GHz mask PPDU 1710.4 as secondary2 channel 1702 is busy.) If the channel BW configuration (e.g., a row of Table 1) indicates that channel bandwidth (CB) of 2.16+2.16 GHz is supported, then primary channel 1706+secondary channel 1708 and secondary1 channel 1704+primary channel 1706 could be used (not secondary2 channel 1702+primary channel 1706 as secondary2 channel is busy.)

Figure 18:
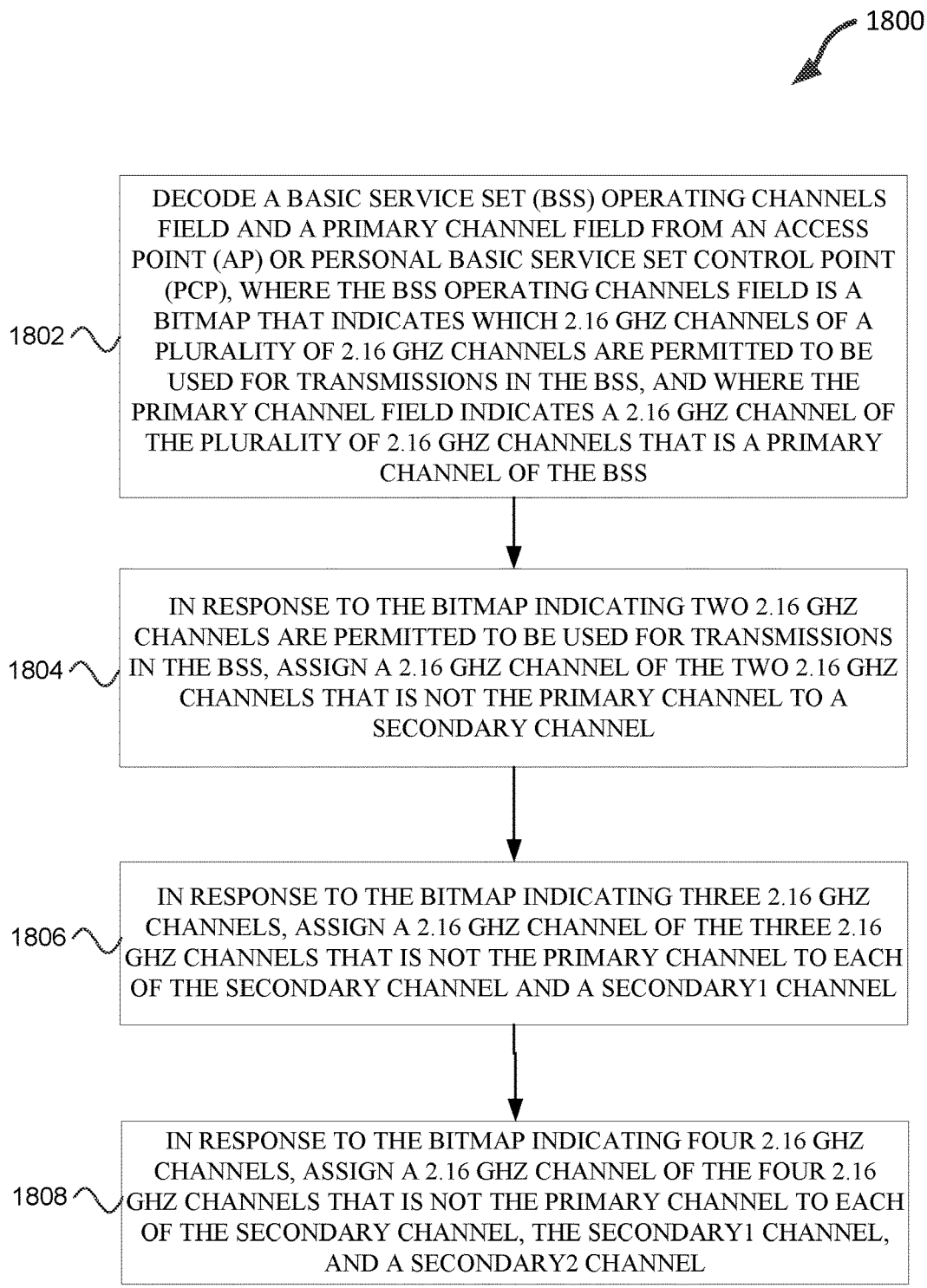
FIG. 18 illustrates a method of assigning secondary millimeter wave channels, in accordance with some embodiments.

FIG. 18 illustrates a method of assigning secondary millimeter wave channels 1800, in accordance with some embodiments. The method 1800 may begin with decoding a BSS operating channels field and a primary channel field from an AP or PCP, where the BSS operating channels field is a bitmap that indicates which 2.16 GHz channels of a plurality of 2.16 GHz channels are permitted to be used for transmissions in the BSS, and where the primary channel field indicates a 2.16 GHz channel of the plurality of 2.16 GHz channels that is a primary channel of the BSS. For example, a STA 504 may decode an EDMG operation element 800 from an AP 502 where the EDMG operation element includes a BSS operating channels field 814 and a primary channel field 808.

The method 1800 may continue at operation 1804 with in response to the bitmap indicating two 2.16 GHz channels are permitted to be used for transmissions in the BSS, assigning a 2.16 GHz channel of the two 2.16 GHz channels that is not the primary channel to a secondary channel. For example, a STA 504 may be configured to determine the secondary channel based on the row of Table 3 that indicates that when 2 2.16 GHz channels are permitted for the BSS, then the row indicates that the second channel is assigned to the 2.16 GHz channel that the primary channel is not assigned to.

The method 1800 may continue at operation 1806 with in response to the bitmap indicating three 2.16 GHz channels, assigning a 2.16 GHz channel of the three 2.16 GHz channels that is not the primary channel to each of the secondary channel and a secondary1 channel. For example, the STA 504 may be configured to determine the secondary channel and the secondary1 channel based on the rows of Table 3 that indicate that three 2.16 GHz channels are permitted for the BSS. The rows indicate assignments of the secondary channel and the secondary1 channel based on a position of the primary channel within the permitted 2.16 GHz channels indicated in the bitmap.

The method 1800 may continue at operation 1808 with in response to the bitmap indicating four 2.16 GHz channels, assigning a 2.16 GHz channel of the four 2.16 GHz channels that is not the primary channel to each of the secondary channel, the secondary1 channel, and a secondary2 channel. For example, the STA 504 may be configured to determine the secondary channel, secondary1 channel, and secondary2 channel based on the rows of Table 3 that indicate that four 2.16 GHz channels are permitted for the BSS. The rows indicate assignments of the secondary channel and the secondary1 channel, which is based on a position of the primary channel within the permitted 2.16 GHz channels indicated in the bitmap.

The method 1800 may continue with configuring the STA to transmit a physical layer (PHY) protocol data unit (PPDU) on one or more of the primary channel, secondary channel, secondary1 channel, and second2 channel. For example, the STA 504 may determine which channels to transmit on as illustrated in FIGS. 15-17.

Method 1800 may be performed in a different order. Method 1800 may include one or more additional operations. One or more of the operations of method 1800 may be optional.

Figure 19:
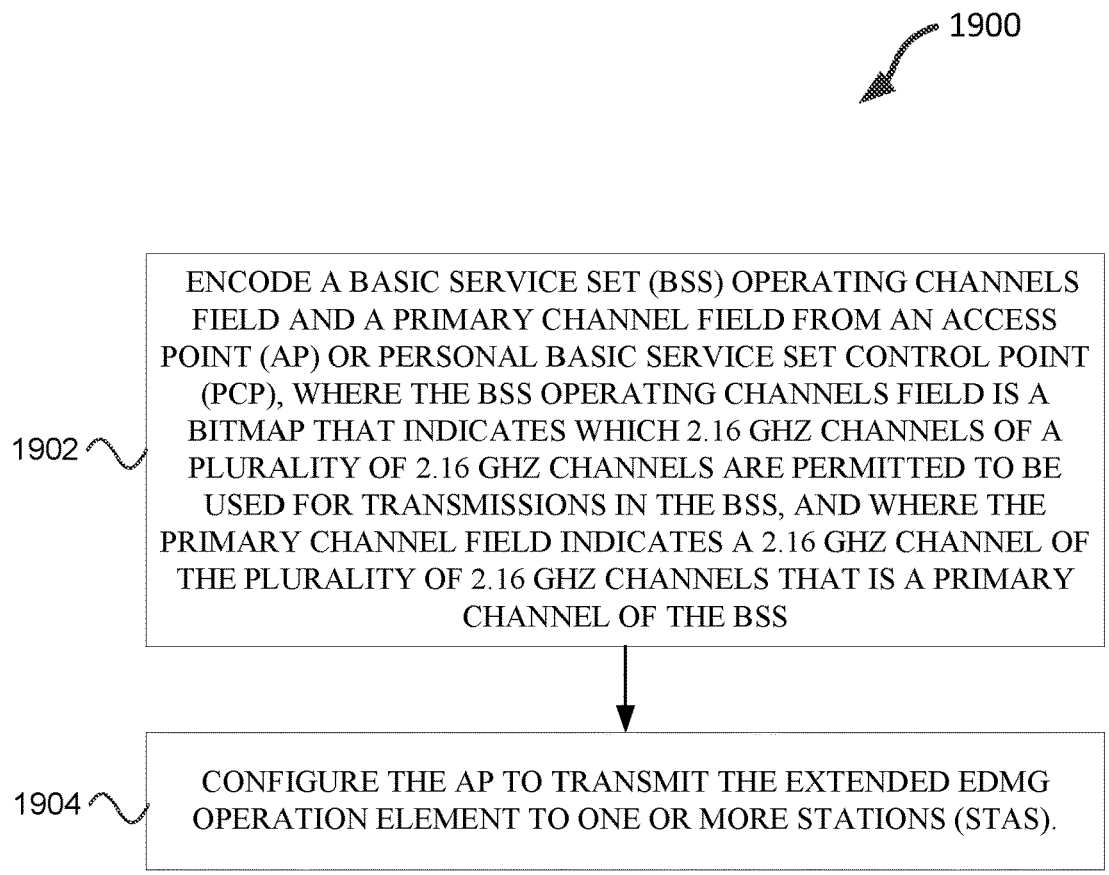
FIG. 19 illustrates a method of assigning secondary millimeter wave channels, in accordance with some embodiments.

FIG. 19 illustrates a method of assigning secondary millimeter wave channels 1900, in accordance with some embodiments. The method 1900 may begin with encoding an extended EDMG) operation element, the extended EDMG operation element comprising a BSS operating channels field and a primary channel field, wherein the BSS operating channels field is a bitmap that indicates which 2.16 GHz channels of a plurality of 2.16 GHz channels are permitted to be used for transmissions in the BSS, and where the primary channel field indicates a 2.16 GHz channel of the plurality of 2.16 GHz channels that is a primary channel of the BSS. For example, AP 502 may encode an EDMG operation element 800 where the EDMG operation element includes a BSS operating channels field 814 and a primary channel 808.

The method 1900 may continue at operation 1904 with configuring the AP to transmit the extended EDMG operation element to one or more STAs. For example, AP 502 may transmit an extended EDMG operation element 800 to one or more STAs 504. In some embodiments, the AP may have to determine the secondary channel, secondary1 channel, secondary2 channel, and primary channel before transmitting as well as determine the allowed the mask PPDUs that may be used. The AP 502 may perform the example illustrated in FIGS. 15-17 to determine a mask PPDU to transmit to the STAs 504. Method 1900 may be performed in a different order. Method 1900 may include one or more additional operations. One or more of the operations of method 1900 may be optional.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising: memory; and processing circuitry coupled to the memory, the processing circuitry configured to:
    decode an enhanced directional multi-gigabit (EDMG) operation element, the EDMG operation element comprising a basic service set (BSS) operating channels field and a primary channel field, wherein the BSS operating channels field is a bitmap that indicates 2.16 GHz channels of a plurality of 2.16 GHz channels that are allowed to be used for transmissions in the BSS, and wherein the primary channel field indicates a 2.16 GHz channel of the plurality of 2.16 GHz channels that is a primary channel of the BSS;
    if the bitmap indicates that two 2.16 GHz channels are allowed to be used for transmissions in the BSS, assign a 2.16 GHz channel of the two 2.16 GHz channels that is not the primary channel to a secondary channel;
    if the bitmap indicates that three 2.16 GHz channels are allowed to be used for transmissions in the BSS, assign a first 2.16 GHz channel of the three 2.16 GHz channels that is not the primary channel to the secondary channel and assign a second 2.16 GHz channel of the three 2.16 GHz channels that is not the primary channel to a secondary1 channel;
    if the bitmap indicates that four 2.16 GHz channels, assign a first 2.16 GHz channel of the four 2.16 GHz channels that is not the primary channel to the secondary channel, assign a second 2.16 GHz channel of the four 2.16 GHz channels that is not the primary channel to a secondary1 channel, assign a third 2.16 GHz channel of the four 2.16 GHz channels that is not the primary channel to a secondary2 channel; and
    configure the STA to transmit a 8.64 GHz mask physical layer (PHY) protocol data unit (PPDU), if the secondary channel, the secondary1 channel, and the secondary 2 channel are contiguous; a 4.32+4.32 GHz mask PPDU, if the primary channel and the secondary channel are contiguous and the secondary1 channel and the secondary2 channel are contiguous; a 6.48 GHz mask PPDU, if the primary channel, the secondary channel, and the secondary1 channel are contiguous; a 4.32 GHz mask PPDU, if the primary channel and the secondary channel are contiguous; a 2.16+2.16 GHz mask PPDU, if the secondary channel, the secondary1 channel, or the secondary2 channel is assigned; or, a 2.16 GHz mask PPDU on one or more of the primary channel, secondary channel, secondary1 channel, and second2 channel.

2. The apparatus of claim 1, wherein the EDMG operation element is received from an access point (AP) or personal basic service set control point (PCP).

3. The apparatus of claim 1, wherein the EDMG operation element further comprises an operating channel width field, wherein the operating channel width field indicates permitted bandwidths that a PPDU transmitted in the BSS can occupy.

4. The apparatus of claim 3, wherein the processing circuitry is further configured to:
    in response to the operating channel width field indicating that channel bandwidth configurations of 2.16 GHz, 4.32 GHz, 6.48 GHz, and 8.64 GHz only are allowed, configure the STA to transmit the 8.64 GHz mask PPDU, the 6.48 GHz mask PPDU, the 4.32 GHz mask PPDU, or the 2.16 GHz mask PPDU on one or more of the primary channel, the secondary channel, the secondary1 channel, and the second2 channel.

5. The apparatus of claim 3, wherein the processing circuitry is further configured to:
    in response to the operating channel width field indicating that channel bandwidth configurations of 2.16 GHz, 4.32 GHz, 6.48 GHz, 8.64 GHz, and 2.16+2.16 GHz only are allowed, configure the STA to transmit the 8.64 GHz mask PPDU, the 6.48 GHz mask PPDU, the 4.32 GHz mask PPDU, the 2.16 GHz mask PPDU, or the 2.16+2.16 GHz mask PPDU on one or more of the primary channel, the secondary channel, the secondary1 channel, and the secondary2 channel.

6. The apparatus of claim 3, wherein the processing circuitry is further configured to:
    in response to the operating channel width field indicating that channel bandwidth configurations of 2.16 GHz, 4.32 GHz, 6.48 GHz, 8.64 GHz, 2.16+2.16 GHz, and 4.32+4.32 GHz only are allowed, configure the STA to transmit a 8.64 GHz mask physical layer (PHY) protocol data unit (PPDU), the 4.32+4.32 GHz mask PPDU, the 6.48 GHz mask PPDU, the 4.32 GHz mask PPDU, the 2.16+2.16 GHz mask PPDU, or the 2.16 GHz mask PPDU on one or more of the primary channel, secondary channel, secondary1 channel, and second2 channel.

7. The apparatus of claim 1, wherein the processing circuitry is further configured to:
    perform a clear channel assessment (CCA).

8. The apparatus of claim 7, wherein the processing circuitry is further configured to:
    in response to receiving a channel-list parameter indicating the primary channel is busy, refrain from configuring the STA to transmit the 8.64 GHz mask PPDU, the 4.32+4.32 GHz mask PPDU, the 6.48 GHz mask PPDU, the 4.32 GHz mask PPDU, the 2.16+2.16 GHz mask PPDU, and the 2.16 GHz mask PPDU.

9. The apparatus of claim 7, wherein the processing circuitry is further configured to:
    configure the STA to transmit the 8.64 GHz mask PPDU, if the secondary channel, the secondary1 channel, and the secondary 2 channel are contiguous and the secondary channel, the secondary1 channel, and the secondary2 channel are indicated as idle by a channel-list parameter; a 4.32+4.32 GHz mask PPDU, if the primary channel and the secondary channel are contiguous and the secondary1 channel and the secondary2 channel are contiguous and the secondary channel, the secondary1 channel, and the secondary2 channel are indicated as idle by the channel-list parameter; a 6.48 GHz mask PPDU, if the primary channel, the secondary channel, and the secondary1 channel are contiguous and the secondary channel and the secondary1 channel are indicated as idle by the channel-list parameter; a 4.32 GHz mask PPDU, if the primary channel and the secondary channel are contiguous and the secondary channel is indicated as idle by the channel-list parameter; a 2.16+2.16 GHz mask PPDU, if the secondary channel, the secondary1 channel, or the secondary2 channel is assigned and the secondary channel, the secondary1 channel, or the secondary2 channel is indicated as idle by the channel-list parameter; or, a 2.16 GHz mask PPDU on one or more of the primary channel, secondary channel, secondary1 channel, and second2 channel, wherein the channel-list parameter is received in response to performing the CCA.

10. The apparatus of claim 7, wherein the processing circuitry is further configured to:
in response to receiving a channel-list parameter indicating the secondary channel is busy, refrain from configuring the STA to transmit on the secondary channel.

11. The apparatus of claim 7, wherein the processing circuitry is further configured to:
in response to receiving a channel-list parameter indicating the secondary1 channel is busy, refrain from configuring the STA to transmit on the secondary1 channel.

12. The apparatus of claim 7, wherein the processing circuitry is further configured to:
in response to receiving a channel-list parameter indicating the secondary2 channel is busy, refrain from configuring the STA to transmit on the secondary2 channel.

13. The apparatus of claim 1, wherein the processing circuitry is configured to:
decode a PPDU, the PPDU comprising the EDMG operation element.

14. The apparatus of claim 1, wherein the STA is one or more from the following group: an Institute of Electrical and Electronic Engineers (IEEE) 802.11ad access point, an IEEE 802.11ad station, an IEEE 802.11 station, an IEEE access point, an IEEE 802.11ay access point, an IEEE 802.11ay station, an IEEE 802.11ad personal basic service set control point (PCP), and an IEEE 802.11ay PCP.

15. The apparatus of claim 1, further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the EDMG operation element.

16. The apparatus of claim 1, further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the EDMG operation element.

17. A non-transitory computer-readable storage medium that stores instructions for execution by one or more processors of an apparatus of a station (STA), the instructions to configure the one or more processors to:
decode an enhanced directional multi-gigabit (EDMG) operation element, the EDMG operation element comprising a basic service set (BSS) operating channels field and a primary channel field, wherein the BSS operating channels field is a bitmap that indicates the 2.16 GHz channels of a plurality of 2.16 GHz channels that are allowed to be used for transmissions in the BSS, and wherein the primary channel field indicates a 2.16 GHz channel of the plurality of 2.16 GHz channels that is a primary channel of the BSS;
if the bitmap indicates that two 2.16 GHz channels are allowed to be used for transmissions in the BSS, assign a 2.16 GHz channel of the two 2.16 GHz channels that is not the primary channel to a secondary channel;
if the bitmap indicates that three 2.16 GHz channels are allowed to be used for transmissions in the BSS, assign a first 2.16 GHz channel of the three 2.16 GHz channels that is not the primary channel to the secondary channel and assign a second 2.16 GHz channel of the three 2.16 GHz channels that is not the primary channel to a secondary1 channel;
if the bitmap indicates that four 2.16 GHz channels, assign a first 2.16 GHz channel of the four 2.16 GHz channels that is not the primary channel to the secondary channel, assign a second 2.16 GHz channel of the four 2.16 GHz channels that is not the primary channel to a secondary1 channel, assign a third 2.16 GHz channel of the four 2.16 GHz channels that is not the primary channel to a secondary2 channel; and
configure the STA to transmit a 8.64 GHz mask physical layer (PHY) protocol data unit (PPDU), a 4.32+4.32 GHz mask PPDU, a 6.48 GHz mask PPDU, a 4.32 GHz mask PPDU, a 2:16+2.16 GHz mask PPDU, or a 2.16 GHz mask PPDU on one or more of the primary channel, secondary channel, secondary1 channel, and second2 channel.

18. The non-transitory computer-readable storage medium of claim 17, wherein the EDMG operation element is received from an access point (AP) or personal basic service set control point (PCP), wherein the EDMG operation element further comprises an operating channel width field, and wherein the operating channel width field indicates permitted bandwidths that a PPDU transmitted in the BSS can occupy.

19. An apparatus of an access point (AP), the apparatus comprising: memory; and processing circuitry coupled to the memory, the processing circuitry configured to:
encode an enhanced directional multi-gigabit (EDMG) operation element, the EDMG operation element comprising a basic service set (BSS) operating channels field and a primary channel field, wherein the BSS operating channels field is a bitmap that indicates the 2.16 GHz channels of a plurality of 2.16 GHz channels that are allowed to be used for transmissions in the BSS, and wherein the primary channel field indicates a 2.16 GHz channel of the plurality of 2.16 GHz channels that is a primary channel of the BSS;
configure the AP to transmit the EDMG operation element to a station (STA).

20. The apparatus of claim 19, wherein the processing circuitry is further configured to:
encode the EDMG operation element to further comprise an operating channel width field, wherein the operating channel width field indicates permitted bandwidths that a PPDU transmitted in the BSS can occupy.

* * * * *

UNITED STATES PATENT AND TRADEMARK OFFICE
CERTIFICATE OF CORRECTION

| | | |
|---|---|---|
| PATENT NO. | : 11,284,403 B2 | Page 1 of 1 |
| APPLICATION NO. | : 16/874946 | |
| DATED | : March 22, 2022 | |
| INVENTOR(S) | : Kedem et al. | |

It is certified that error appears in the above-identified patent and that said Letters Patent is hereby corrected as shown below:

On the Title Page

Item (72), in "Inventors", in Column 1, Line 2, delete "Novgorod" and insert --Nizhny Novgorod-- therefor In the Claims In Column 23, Line 63, in Claim 1, delete "second2" and insert --secondary2-- therefor In Column 24, Line 15, in Claim 4, delete "second2" and insert --secondary2-- therefor In Column 24, Line 39, in Claim 6, delete "second2" and insert --secondary2-- therefor In Column 25, Line 11, in Claim 9, delete "second2" and insert --secondary2-- therefor In Column 25, Line 56, in Claim 17, delete "Anon-transitory" and insert --A non-transitory-- therefor In Column 26, Line 29, in Claim 17, delete "2:16+2.16" and insert --2.16+2.16-- therefor In Column 26, Line 32, in Claim 17, delete "second2" and insert --secondary2-- therefor Signed and Sealed this
Fifth Day of July, 2022

Katherine Kelly Vidal
*Director of the United States Patent and Trademark Office*